United States Patent
Fujita et al.

(10) Patent No.: US 7,413,625 B2
(45) Date of Patent: Aug. 19, 2008

(54) BONDING METHOD OF CERAMIC HONEYCOMB STRUCTURE

(75) Inventors: Jun Fujita, Nagoya (JP); Takahisa Kaneko, Nagoya (JP); Yukihisa Wada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/541,841

(22) PCT Filed: Jan. 14, 2004

(86) PCT No.: PCT/JP2004/000199

§ 371 (c)(1),
(2), (4) Date: Apr. 28, 2006

(87) PCT Pub. No.: WO2004/063122

PCT Pub. Date: Jul. 29, 2004

(65) Prior Publication Data

US 2006/0254713 A1 Nov. 16, 2006

(30) Foreign Application Priority Data

Jan. 14, 2003 (JP) .............................. 2003-006112

(51) Int. Cl.
*C09J 5/00* (2006.01)

(52) U.S. Cl. .................. 156/312; 156/581; 55/524; 428/116

(58) Field of Classification Search ................. 156/295, 156/89.22, 312, 581; 428/116; 144/250.12; 55/524

See application file for complete search history.

(56) References Cited

U.S. PATENT DOCUMENTS 4,115,178 A * 9/1978 Cone et al. .................. 156/291

FOREIGN PATENT DOCUMENTS

| JP | A 2000-007455 | 1/2000 |
| JP | A 2002-219317 | 8/2002 |

* cited by examiner

*Primary Examiner*—Richard Crispino
*Assistant Examiner*—Christopher Schatz
(74) *Attorney, Agent, or Firm*—Oliff & Berridge, PLC

(57) ABSTRACT

Respective pieces of the porous honeycomb segments (2) are stacked while interposing the adhesive layers between respective adhered surfaces (2a), and are bonded together by performing main pressurization (F1, F2) on the whole through the porous honeycomb segments (2) located on an outermost layer after stacking a predetermined number of pieces. Main pressurization force at this time is simultaneously applied to all the honeycomb segments (2) and does not act as a separating force against any of the honeycomb segments (2).

3 Claims, 6 Drawing Sheets

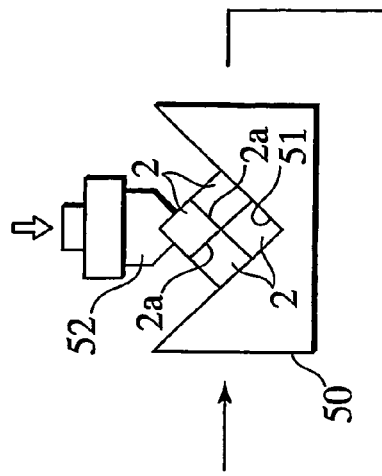
FIG.2A
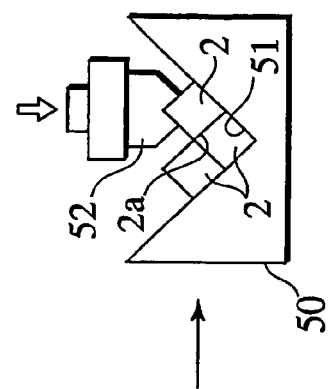
FIG.2B
FIG.2C
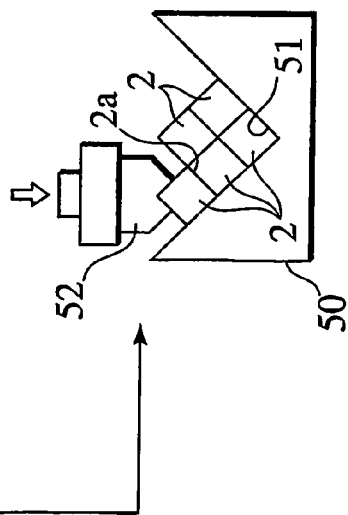
FIG.2D
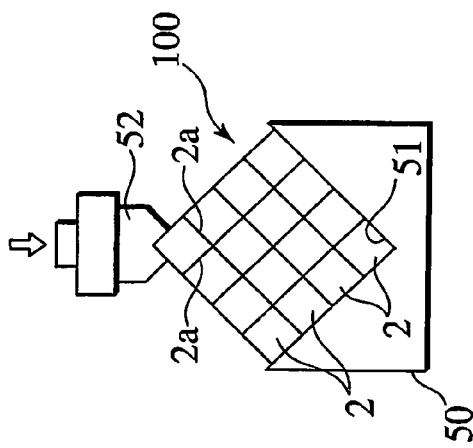
FIG.2E

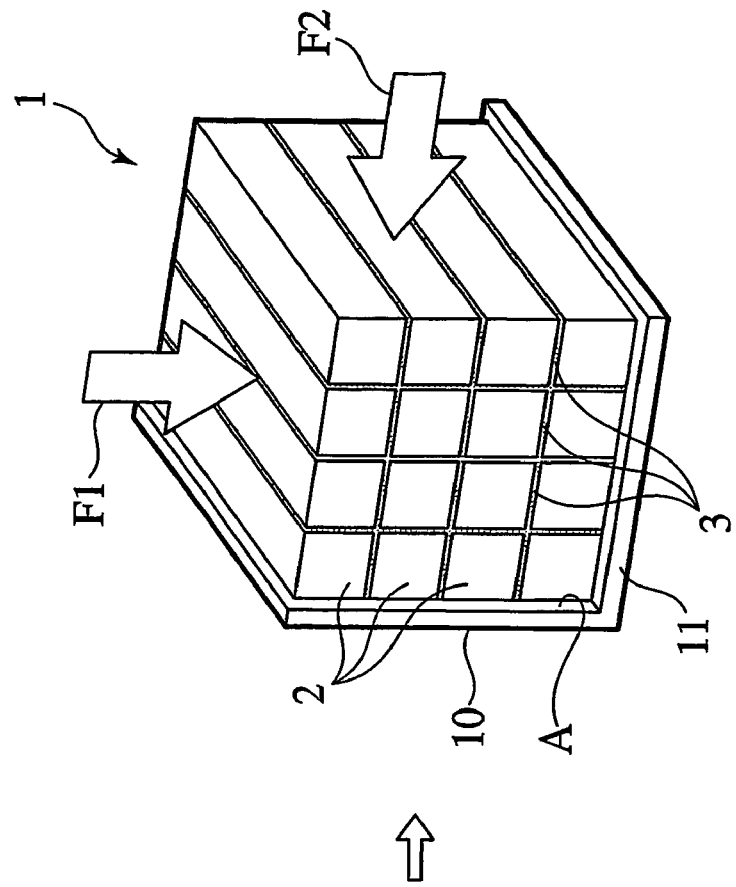
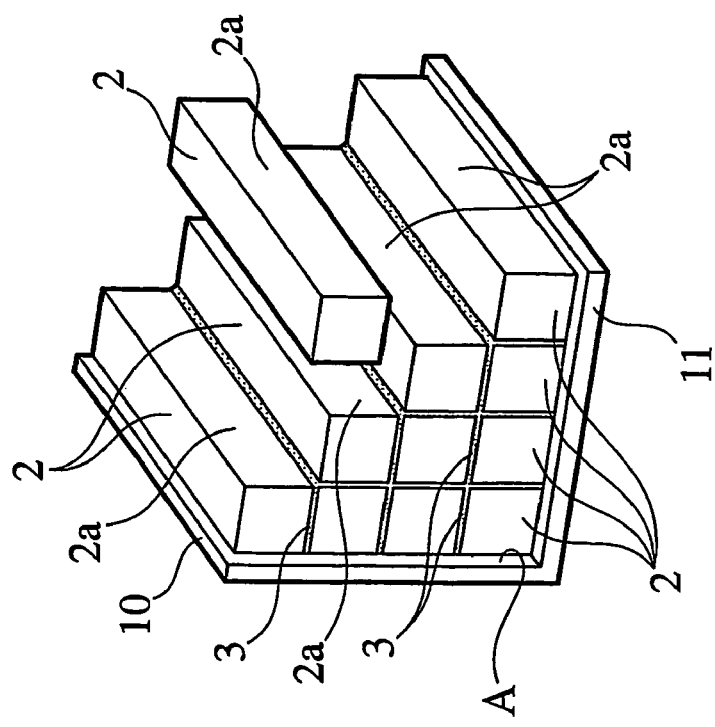

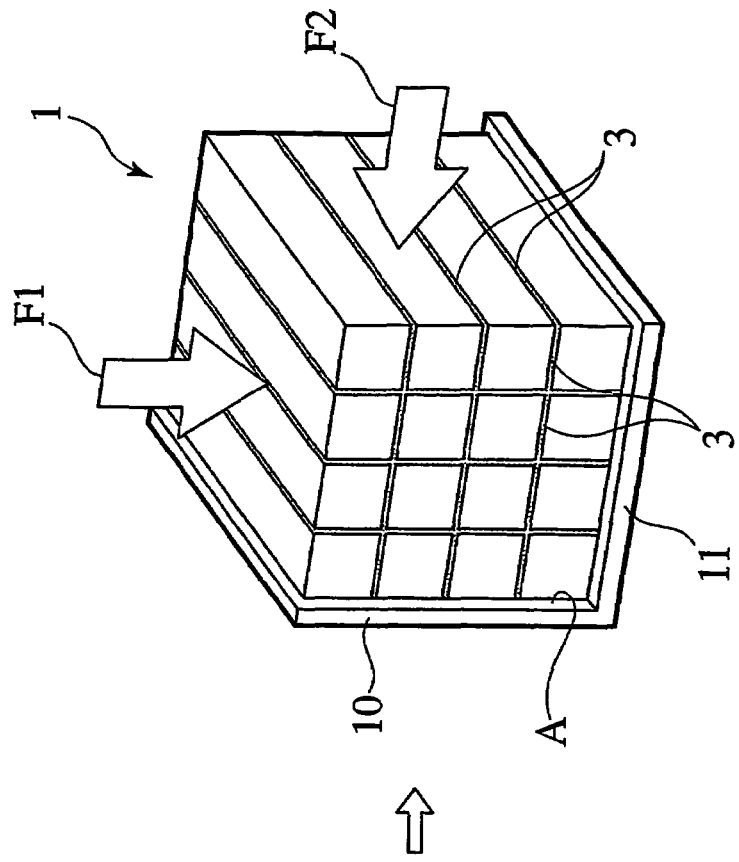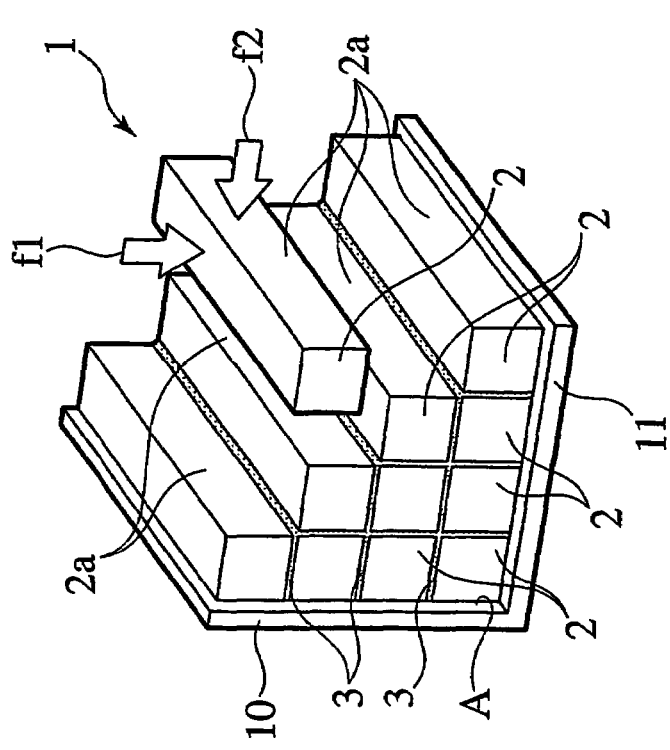

BONDING METHOD OF CERAMIC HONEYCOMB STRUCTURE

TECHNICAL FIELD

The present invention relates to a bonding method of a ceramic honeycomb structure, which is used for filters for collecting particles in exhaust gases from inner combustion engines and boilers as well as catalyst bearers utilizing a catalyst to be used for chemical reactors, fuel cell reformers and the like.

BACKGROUND ART

As shown in FIG. 1, a ceramic honeycomb structure 100 of this type is formed by bundling a plurality of porous honeycomb segments 2 through adhesive layers 3, where the porous honeycomb segments 2 are provided with numerous circulation holes 4 partitioned by partition walls and penetrated in an axial direction.

Document 1: Japanese Unexamined Patent Publication No. 2000-7455

Specifically, the ceramic honeycomb structure 100 is formed by mutually bonding sixteen pieces of the porous honeycomb segments 2 each in a quadratic prism shape into a four-by-four matrix through the adhesive layers 3.

Bonding at this time is performed by interposing the adhesive layer 3 between adhered surfaces 2a and 2a of the porous honeycomb segments 2 and 2, and then giving vibration to the honeycomb segments 2 and 2 while applying a pressing force thereto.

Specifically, in the bonding process, as shown in FIGS. 2A to 2E, a first porous honeycomb segment 2 in which a foundation layer is formed on an adhered surface 2a is firstly placed on the lowermost portion of a notched portion 51 of a supporting jig 50. Next, a second porous honeycomb segment 2, in which a foundation layer is formed on one adhered surface 2a and an adhesive is further coated on the foundation layer, is disposed closely to the first honeycomb segment 2 so as to allow the adhered surfaces 2a to face each other while interposing the adhesive therebetween (see FIG. 2A). In this state, end surfaces of the two honeycomb segments 2 and 2 are pressed with a pressing plate (not shown) and are positioned in advance. Further, a pressing jig 52 is allowed to abut on the latter honeycomb segment 2 so as to press the honeycomb segment 2 in a vertical direction, and vibration is given in a direction to mutually shift the adhered surfaces 2a and 2a. In this way, it is possible to bond the first and second honeycomb segments 2 and 2 together.

Next, a third porous honeycomb segment 2, in which a foundation layer is formed on one adhered surface 2a and an adhesive is further coated on the foundation layer, is disposed closely so as to allow the adhered surface 2a thereof and another adhered surface 2a of the first honeycomb segment 2 to face each other while interposing the adhesive therebetween (see FIG. 2B) In this state, it is possible to bond the third honeycomb segment 2 to the first honeycomb segment 2 as similar to the second honeycomb segment 2.

Moreover, a fourth porous honeycomb layer 2, in which a foundation layer is formed on two adhered surfaces 2a and 2a and an adhesive is further coated on the foundation layer, is disposed closely between the second and third honeycomb segments 2 and 2 (see FIG. 2C). In this state, it is possible to bond the fourth honeycomb segment 2 to both the second and third honeycomb segments 2 and 2 as similar to the second and third honeycomb segments 2.

Furthermore, a fifth porous honeycomb layer 2, in which a foundation layer is formed on one adhered surface 2a and an adhesive is further coated on the foundation layer, is disposed closely so as to allow another adhered surface 2a of the second honeycomb segment 2 and the adhered surface 2a thereof to face each other while interposing the adhesive therebetween (see FIG. 2D). In this state, it is possible to bond the fifth honeycomb segment 2 to the second honeycomb segment 2 as similar to the foregoing process.

Subsequently, respective honeycomb segments 2 are sequentially bonded likewise by giving pressure and vibration every time. Lastly, a sixteenth porous honeycomb segment 2, in which a foundation layer is formed on two adhered surfaces 2a and 2a and an adhesive is further coated on the foundation layer, is bonded while giving pressure and vibration, whereby the bonding process for the ceramic honeycomb structure 100 can be completed (see FIG. 2E).

However, the conventional bonding method is configured to bond the respective porous honeycomb segments 2 sequentially while giving pressure and vibration every time. Accordingly, the vibration and the pressure are transmitted to the lower segments in the earlier stacking order (the segments located around the above-described first porous honeycomb segment 2) until completion of bonding of the last honeycomb segment (which is the sixteenth porous honeycomb segment 2 in the above-described example). The transmitted force acts as a separating force against the honeycomb segments 2 and 2 which are bonded to each other. Accordingly, the method has a problem that the adhesive layers 3 for bonding the lower honeycomb segments are separated, thereby causing partial deterioration of adhesive strength.

Accordingly, an object of this invention is to provide a bonding method of a ceramic honeycomb structure, which is capable of maintaining adhesive layers for bonding respective porous honeycomb segments in an original state of stacking irrespective of the order of stacking the respective honeycomb segments, and thereby bonding the whole honeycomb segments uniformly at desired adhesive strength.

SUMMARY OF THE INVENTION

To attain the object, a first characteristic of the present invention is a bonding method of a ceramic honeycomb structure formed by bundling a plurality of porous honeycomb segments through adhesive layers, where the porous honeycomb segments are provided with numerous circulation holes partitioned by partition walls and penetrated in an axial direction. Here, the respective pieces of the porous honeycomb segments are stacked while interposing the adhesive layers between respective adhered surfaces, and are bonded together by performing main pressurization on the whole through the porous honeycomb segments located on an outermost layer after stacking a predetermined number of pieces.

According to the first characteristic of the present invention, main pressurization is performed on the whole simultaneously through the porous honeycomb segments located on the outermost layer after stacking the predetermined number of the porous honeycomb segments. The main pressurization force at this time is simultaneously applied to all the honeycomb segments and does not act as a separating force against any of the honeycomb segments.

Meanwhile, a second characteristic of the present invention is the bonding method of a ceramic honeycomb structure having the first characteristic of the present invention, in which the respective porous honeycomb segments are subjected to preliminary pressurization at the time of stacking by weaker pressure than the main pressurization.

According to the second characteristic of the present invention, it is possible to allow bubbles trapped during the stacking to escape at the time of preliminary pressurization without causing movement of other bonded honeycomb segments.

Meanwhile, a third characteristic of the present invention is the bonding method of a ceramic honeycomb structure having the second characteristic of the present invention, in which the preliminary pressurization is performed at pressure equal to or below 0.5 kgf/cm$^2$.

For this reason, according to the third characteristic of the present invention, it is possible to prevent the honeycomb segments from being separated at the time of preliminary pressurization and to exert a bubble eliminating action as well.

BRIEF DESCRIPTION OF THE DRAWINGS

FIGS. 2A to 2E are more detailed explanatory views of the conventional bonding method of a ceramic honeycomb structure.

FIGS. 3A and 3B are explanatory views of a bonding method of a ceramic honeycomb structure as one embodiment of the present invention, in which FIG. 3A shows a step in the course of stacking and FIG. 3B shows a final step of stacking, respectively.

FIGS. 5A and 5B are explanatory views of a bonding method of a ceramic honeycomb structure as another embodiment of the present invention, in which FIG. 5A shows a step in the course of stacking and FIG. 5B shows a final step of stacking, respectively.

MOST PREFERABLE EMBODIMENT OF THE INVENTION

Figure 1:
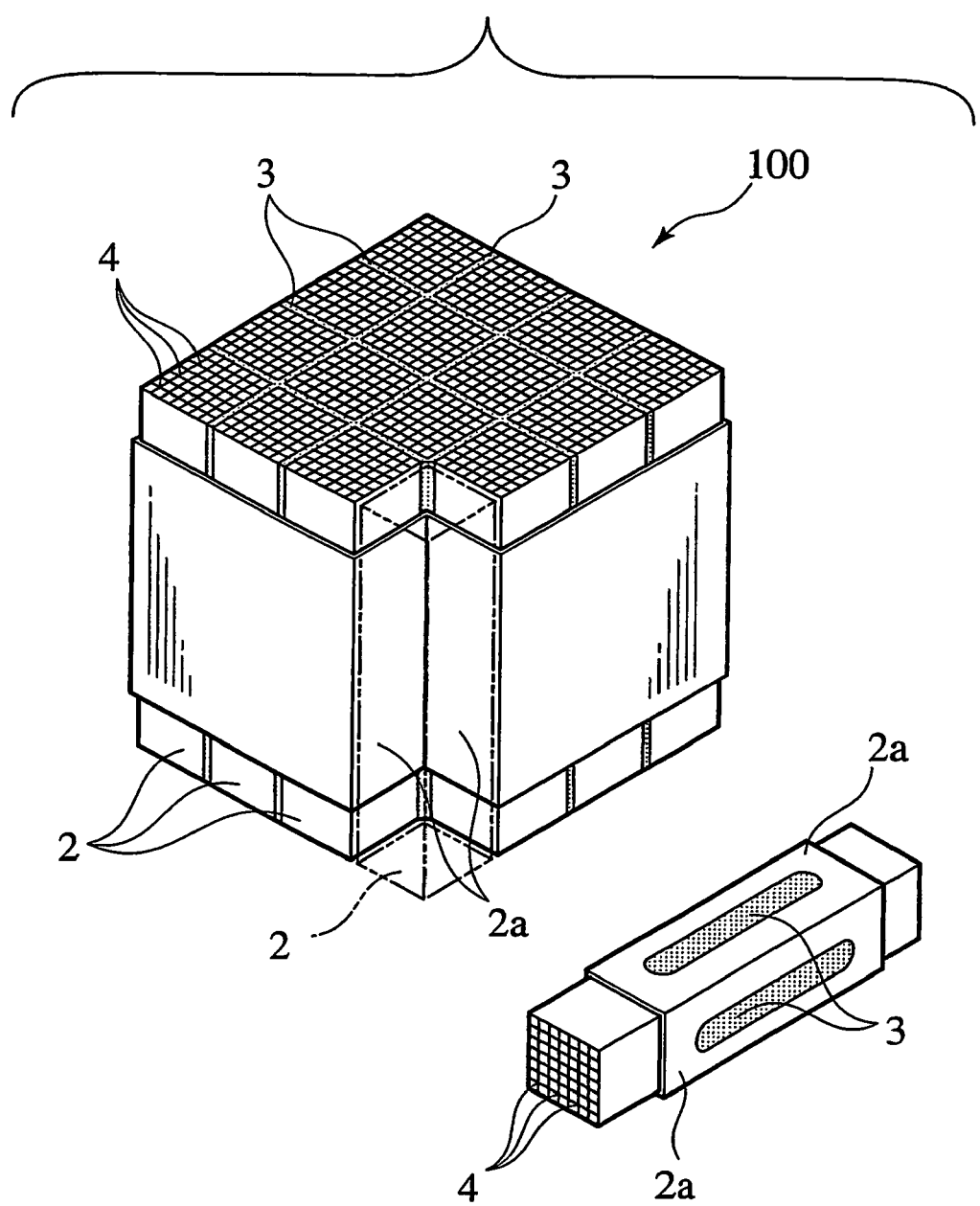
FIG. 1 is an explanatory view of a conventional bonding method of a ceramic honeycomb structure.

Now, the most preferable embodiment of the present invention will be described below. Here, the same constituents as those shown in FIG. 1 and FIGS. 2A to 2E are designated by the same reference numerals and explanation thereof will be simplified.

FIGS. 3A and 3B show a bonding method of a ceramic honeycomb structure 1 as one embodiment of the present invention. This ceramic honeycomb structure 1 is formed by bundling a plurality of porous honeycomb segments 2 through adhesive layers 3, where the porous honeycomb segments 2 are provided with numerous circulation holes partitioned by partition walls and penetrated in an axial direction. The porous honeycomb segments 2 at this time are similar to those shown in FIG. 1. The circulation holes 4 are omitted in FIGS. 3A and 3B.

Moreover, in the bonding method at this time, the respective porous honeycomb segments 2 are stacked while interposing the adhesive layers between respective adhered surfaces 2a and 2a thereof, and are bonded together by performing main pressurization on the whole through the porous honeycomb segments 2, 2, and so on located on an outermost layer after stacking a predetermined number. The main pressurization at this time is indicated by an arrow F1 in a vertical downward direction and an arrow F2 in a horizontal direction in FIG. 3B.

To be more precise, the porous honeycomb segment 2 applies at least one ceramic selected from the group consisting of silicon carbide, silicon nitride, cordierite, alumina, mullite, zirconia, zirconium phosphate, aluminum titanate, titania, and combinations thereof, Fe—Cr—Al group metal, nickel group metal or metal Si and SiC, and the like as raw materials, for example. A plastic green body is formed by adding a binder such as methylcellulose or hydroxypropoxyl methylcellulose, a surfactant, water, and the like thereto.

Figure 6A:
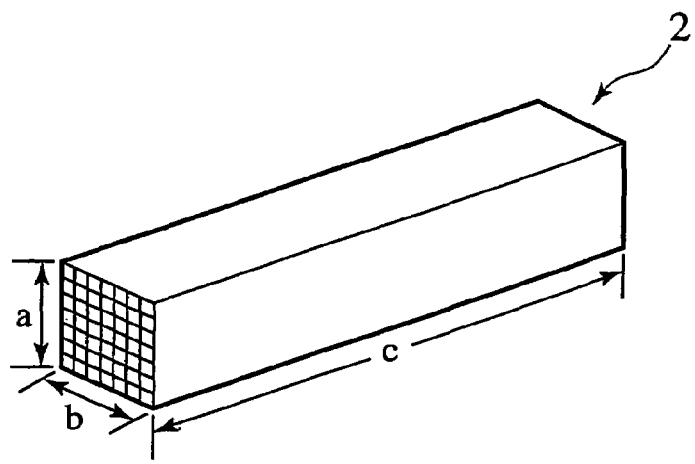
FIG. 6A is a perspective view of a specimen honeycomb segment and FIG. 6B is a perspective view of a ceramic honeycomb structure formed by bonding the specimen honeycomb segments.

This green body is subjected to extrusion molding, for example, and a honeycomb compact of a quadratic prism shape having numerous circulation holes 4 partitioned by the partition walls and penetrated in the axial direction is formed (see FIG. 6A). The porous honeycomb segment 2 as shown in FIG. 6A can be manufactured by drying this compact by use of microwaves, hot air or the like, and then firing.

In the present invention, after manufacturing the honeycomb segments 2, these honeycomb segments 2, 2, and so on are bonded and integrated together. The present invention is characterized by this bonding method.

In this bonding method, as shown in FIG. 3A, a storage area A having an L-shape cross section is firstly formed by use of a longitudinal supporting plate 10 and a lateral supporting plate 11, and the respective honeycomb segments 2 are stacked in this storage area A while interposing the adhesive layers 3 between the respective adhered surfaces 2a and 2a. This stacking is performed while aligning two surfaces along the longitudinal supporting plate 10 and the lateral supporting plate 11.

As for the adhesive in the adhesive layer 3, it is preferable to use slurry containing the ceramic having the same composition as the honeycomb segment 2. For example, it is preferable to use one made of ceramic powder common to the constituents of the honeycomb segment 2 with addition of inorganic fibers such as ceramic fibers, an organic or inorganic binder, and a dispersant such as water. It is also preferable to include a sol substance such as Si sol. The adhesive layer 3 can be formed by providing the adhered surface 2a of the honeycomb segment 2 with this adhesive. This adhesive layer 3 may be formed on the honeycomb segment 2 before stacking or on the exposed adhered surface 2a of the honeycomb segment 2 which is stacked already. Moreover, the stacking is performed by stacking the honeycomb segments 2 one-by-one.

Next, as shown in FIG. 3B, after stacking a predetermined number (which is equal to 16 pieces in this embodiment) of the honeycomb segments 2, the main pressurization is performed on the whole simultaneously in the directions of the arrows F1 and F2 through the porous honeycomb segments 2, 2, and so on located on the outermost layer. Concerning the main pressurization at this time, since two surfaces of the stacked body is covered with the longitudinal supporting plate 10 and the lateral supporting plate 11, other two surfaces are subjected to the main pressurization on the whole simultaneously in the directions of the arrows F1 and F2. Air cylinders, hydraulic cylinders, and the like are used as pressurizing power at this time.

Figure 4:
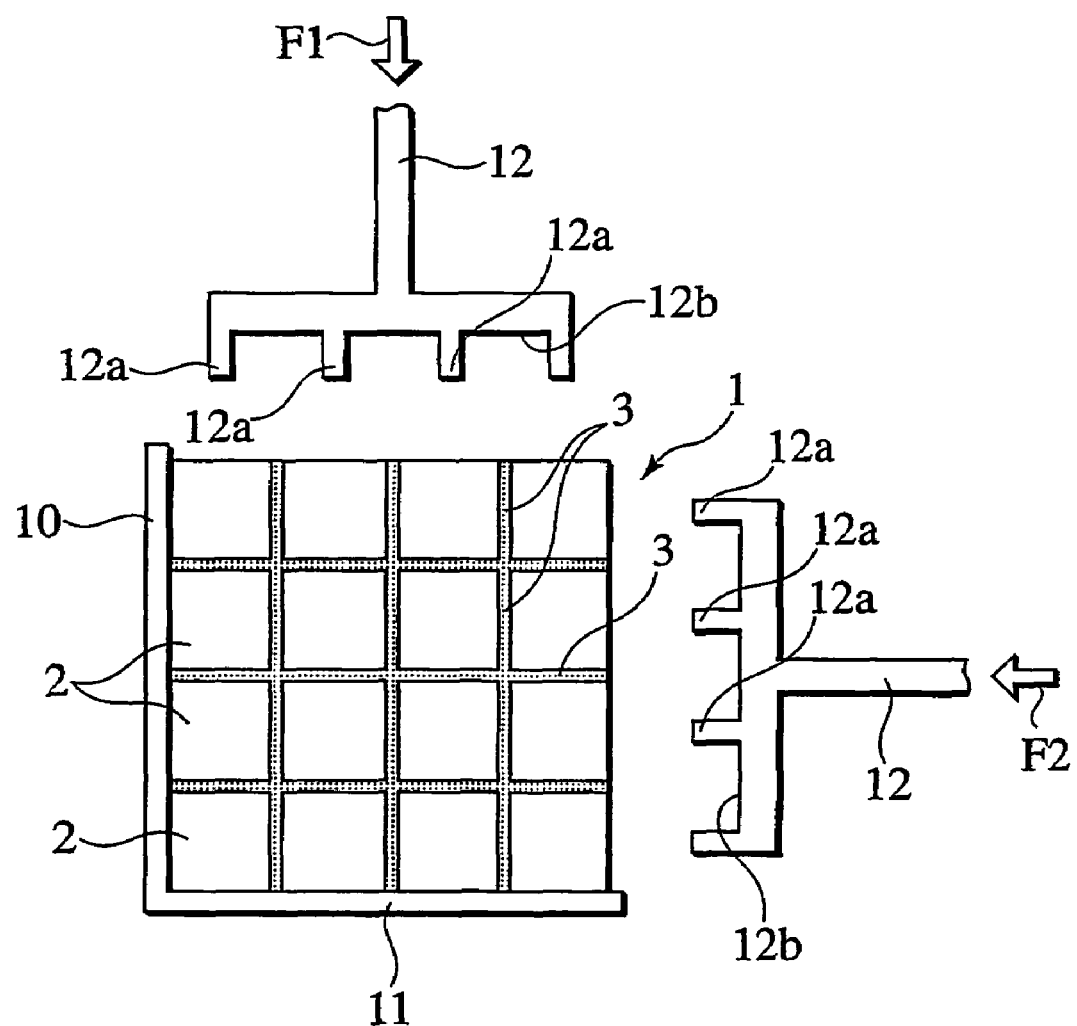
FIG. 4 is an explanatory view for explaining main pressurization in the final step of stacking in the bonding method of the one embodiment of the present invention.

As shown in FIG. 4 preferably, the main pressurization at this time can be performed by use of pressing jigs 12 including pressing ribs 12a in the number equivalent to the porous honeycomb segments 2 located on the outermost layer, which are provided on pressing surfaces 12b so as to abut on approximate centers of side surfaces of the porous honeycomb segments 2 on the outermost layer. The pressing rib 12a is preferably allowed to abut on a line mutually connecting the approximate centers of two short edges on the side surfaces of the honeycomb segment 2.

In this configuration, a clearance equivalent to the height of the pressing ribs 12a is formed between the side surfaces of the porous honeycomb segments 2 on the outermost layer and the pressing surface 12b. Accordingly, it is possible to avoid the protruded adhesive from being attached to the pressing surface 12b.

In this way, the ceramic honeycomb structure 1 is configured to be subjected to the main pressurization on the whole simultaneously through the porous honeycomb segments 2 located on the outermost layer after stacking the predetermined number of the porous honeycomb segments 2. Therefore, the main pressurization forces F1 and F2 at this time are applied to all the honeycomb segments 2 and do not act as a separating force against any of the honeycomb segments 2.

In this way, the adhesive layers 3 can be prevented from being separated abnormally. Therefore, it is possible to maintain the adhesive layers 3 for bonding respective honeycomb segments 2 in an original state of stacking. Accordingly, it is possible to bond the respective porous honeycomb segments 2 uniformly together at desired adhesive strength irrespective of the order of stacking.

FIGS. 5A and 5B show another bonding method of the ceramic honeycomb structure as another embodiment of the present invention. In this bonding method, the only difference is that the respective porous honeycomb segments 2 are subjected to preliminary pressurization at the time of stacking by weaker pressure than the main pressurization. Other configurations are similar to the above-described embodiment. The preliminary pressurization is indicated by an arrow f1 in a vertical downward direction and an arrow f2 in a horizontal direction in FIG. 3(a). Here, the expression "at the time of stacking" means "from a time point when an n-th honeycomb segment 2 is disposed in an n-th predetermined portion to a time point when an (n+1)-th honeycomb segment 2 is disposed in an (n+1)-th predetermined position" (n is a natural number).

Specifically, as shown in FIG. 5A, the respective porous honeycomb segments 2 are stacked while interposing the adhesive layers 3 between the respective adhered surfaces 2a and 2a, and the preliminary pressurization is performed for each of the porous honeycomb segments 2 at the time of stacking in the directions of the arrows f1 and f2. After stacking a predetermined number (which is equal to 16 pieces in this embodiment) of the honeycomb segments 2 as described above, the main pressurization is performed on the whole simultaneously in the directions of the arrows F1 and F2 through the porous honeycomb segments 2, 2, and so on located on the outermost layer as shown in FIG. 5B.

As described above, according to the bonding method of this embodiment, the preliminary pressurization is performed by the weaker pressure than the main pressurization. Therefore, it is possible to allow bubbles trapped during the stacking to escape at the time of preliminary pressurization without causing movement of other already bonded honeycomb segments 2. Accordingly, the adhesive layers 3 are not separated along with the movement of the honeycomb segments 2 at the time of stacking and it is also possible to obtain a bubble eliminating action as well. Hence, it is possible to further enhance the adhesive strength of the ceramic honeycomb structure 1.

Moreover, the preliminary pressurization is preferably performed by use of pressure equal to or below 0.5 kgf/cm².

In this configuration, it is possible to prevent the honeycomb segments 2 from being separated at the time of preliminary pressurization and to exert the bubble eliminating action as well. In this way, it is surely possible to further enhance the adhesive strength of the ceramic honeycomb structure 1. Incidentally, when the preliminary pressurization force exceeds 0.5 kgf/cm², other already bonded honeycomb segments 2 may be moved during the preliminary pressurization and the adhesive layers 3 may be separated due to this movement.

Now, examples will be described.

EXAMPLE 1

Figure 6B:
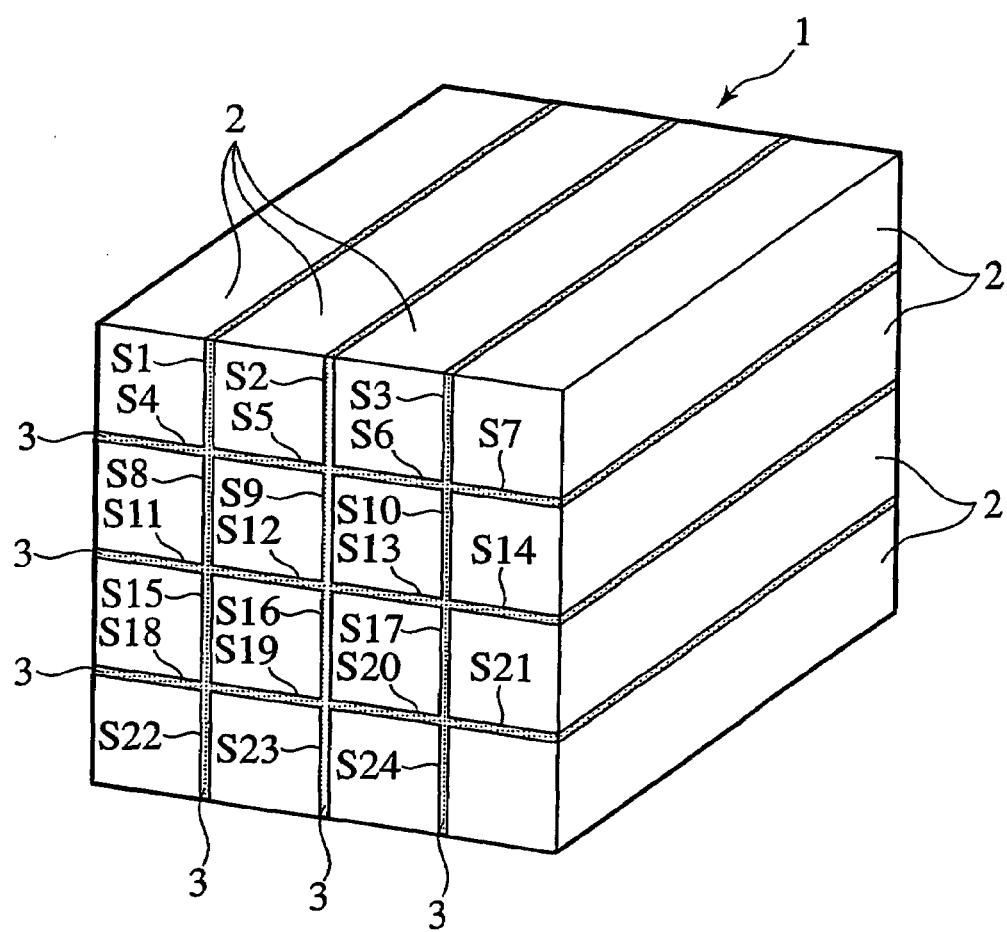

FIGS. 6A and 6B show a specimen honeycomb segment 2 (FIG. 6A), and a ceramic honeycomb structure 1 (FIG. 6B) which is formed by bonding 16 pieces of the specimen honeycomb segments 2 together while interposing the adhesive layers 3.

The specimen honeycomb segment 2 is formed into a quadratic prism having dimensions of a=35 mm, b=35 mm, and c=152 mm.

The adhesive constituting the adhesive layers 3 applied a composition of 39% by mass of SiC, 30% by mass of aluminosilicate, 20% by mass of colloidal silica, 1% by mass of an inorganic plasticizer, and 10% by mass of water, which had viscosity of 350 p.

As for the bonding method, the one applying the bonding method shown in FIGS. 3A and 3B was defined as Example 1, and one applying a bonding method configured to stack the honeycomb segments 2 one-by-one and to give pressure and vibration at the time of stacking was defined as Comparative Example 1.

Bonding Conditions: In Example 1, the main pressurization was performed at a pressurization surface pressure of 1.5 kgf/cm².

In Comparative Example 1, the pressurization at the time of stacking was performed at a pressurization surface pressure of 1.5 kgf/cm², and vibration was given at a vibration frequency of 200 Hz.

Consideration: Ten pieces of the ceramic honeycomb structure 1 were respectively fabricated by applying Example 1 and Comparative Example 1. Then, existence of separation on interfaces of the adhesive layers attributable to propagation of vibration to the adhesive layers 3 at boundary regions S1 to S24 between the honeycomb segments 2 and 2 was observed by the naked eye for each of the ceramic honeycomb structures 1. The numbers of the boundary regions causing the separation were summarized in Table 1.

TABLE 1

| Bonding method | Samples | | | | | | | | | |
|---|---|---|---|---|---|---|---|---|---|---|
| | 1 | 2 | 3 | 4 | 5 | 6 | 7 | 8 | 9 | 10 |
| Example 1 | 0 | 0 | 0 | 0 | 0 | 0 | 0 | 0 | 0 | 0 |
| Comparative Example 1 | 8 | 10 | 12 | 3 | 4 | 7 | 5 | 9 | 11 | 12 |

As is apparent from Table 1, three to twelve boundary regions causing the separation were observed in each of the ceramic honeycomb structures 1 in Comparative Example 1. However, no boundary regions causing the separation were observed in Example 1. Accordingly, it is possible to realize that Example 1 can enhance the adhesive strength of the ceramic honeycomb structure 1 as compared to Comparative Example 1.

EXAMPLES 1, 2, and 3

Example 1 applies the bonding method shown in FIGS. 3A and 3B. Example 2 applies the bonding method shown in FIGS. 5A and 5B in which the preliminary pressurization force was set to 0.25 kgf/cm$^2$. Example 3 applies the bonding method shown in FIGS. 5A and 5B in which the preliminary pressurization force was set to 0.5 kgf/cm. Comparative Example 2 applies the bonding method shown in FIGS. 5A and 5B in which the preliminary pressurization force was set to 1 kgf/cm$^2$. Comparative Example 3 applies the bonding method shown in FIGS. 5A and 5B in which the preliminary pressurization force was set to 1.5 kgf/cm$^2$. Comparative Example 4 applies the bonding method shown in FIGS. 5A and 5B in which the preliminary pressurization force was set to 2 kgf/cm$^2$. Comparative Example 5 applies the bonding method shown in FIGS. 5A and 5B in which the preliminary pressurization force was set to 2.5 kgf/cm$^2$.

At this time, the main pressurization in Examples 1, 2, and 3, and Comparative Examples 2, 3, 4, and 5 was performed at the pressure of 1.0 kgf/cm$^2$. All other conditions were set identical to the above-described Example 1.

Consideration: The ceramic honeycomb structures 1 were fabricated by applying Examples 1, 2, and 3, and Comparative Examples 2, 3, 4, and 5, respectively. Then, existence of separation phenomena of the honeycomb segments 2 at the time of preliminary pressurization was observed by the naked eye in terms of each of the bonding methods, and proportions of bubbles in the adhesive layers 3 of the fabricated ceramic honeycomb structures 1, and the adhesive strength between the honeycomb segments 2 and 2 were measured.

Measurement of the proportions of bubbles was performed by cutting off the adhesive and the honeycomb segments on the interface, capturing the cross section as an image by use of a scanner connected to a personal computer, performing image processing, and calculating the proportion of the area of bubbles relative to the entire area.

Meanwhile, as for the method of measuring the bonding strength, given samples for strength tests were cut out in accordance with JIS R1601, and three-point bending bonding strength was measured.

Results are summarized in Table 2.

TABLE 2

| Bonding method | Preliminary pressurization force (Kgf/cm$^2$) | Separation at the time of preliminary pressurization | Proportion of bubbles | Bonding density (Kgf/cm$^2$) |
| --- | --- | --- | --- | --- |
| Example 1 | none | no | 25% | 250 |
| Example 2 | 0.25 | no | 5% | 310 |
| Example 3 | 0.5 | no | 0% | 340 |
| Comparative Example 2 | 1 | yes | 0% | — |
| Comparative Example 3 | 1.5 | yes | 0% | — |
| Comparative Example 4 | 2 | yes | 0% | — |
| Comparative Example 5 | 2.5 | yes | 0% | — |

In Table 2, existence of the separation phenomena of the honeycomb segments 2 at the time of preliminary pressurization was indicated in the item "Separation at the time of preliminary pressurization", the proportions of bubbles in the adhesive layers 3 were indicated in the item "Proportion of bubbles", and the adhesive strength between the honeycomb segments 2 and 2 were indicated in the item "Bonding strength".

As is apparent from Table 2, according to the bonding methods of Examples 2 and 3 applying the preliminary pressurization at the pressure equal to or below 0.5 kgf/cm$^2$, occurrence of the separation phenomena of the honeycomb segments 2 was not found at the time of preliminary pressurization and at the time of main pressurization. In addition, the proportion of bubbles became equal to or below Example 1, and the bonding strength exceeding Example 1 was obtained.

The bonding method of Example 1 does not include the preliminary pressurization, and therefore increases the proportion of bubbles and causes a decrease in the bonding strength. However, occurrence of the separation phenomena of the honeycomb segments 2 was not found at the time of main pressurization.

On the contrary, according to the bonding methods of Comparative Examples 2, 3, 4, and 5 applying the preliminary pressurization at the pressure equal to or above 1 kgf/cm$^2$, occurrence of the separation phenomena of the honeycomb segments 2 was found at the time of preliminary pressurization, and the methods failed to complete the ceramic honeycomb structures 1.

INDUSTRIAL APPLICABILITY

As described above, according to the first characteristic of the present invention, the main pressurization acts on the respective honeycomb segments on the whole and simultaneously, and does not act as a separating force against any of the honeycomb segments. Therefore, it is possible to maintain adhesive layers for bonding the respective porous honeycomb segments in an original state of stacking. Accordingly, it is possible to bond the respective porous honeycomb segments uniformly at desired adhesive strength irrespective of the order of stacking thereof.

Meanwhile, according to the second characteristic of the present invention, it is possible to allow bubbles trapped during the stacking to escape at the time of preliminary pressurization without causing movement of other already bonded honeycomb segments. Therefore, in addition to the advantage of the first characteristic of the present invention, it is possible to further enhance the adhesive strength.

Meanwhile, according to the third characteristic of the present invention, the preliminary pressurization is performed at pressure equal to or below 0.5 kgf/cm$^2$. Therefore, it is possible to prevent the honeycomb segments from being separated at the time of preliminary pressurization and to exert a bubble eliminating action as well. In this way, it is possible to further enhance the adhesive strength in addition to the advantage of the third characteristic of the present invention.

The invention claimed is:

1. A bonding method of a ceramic honeycomb structure formed by bundling a plurality of porous honeycomb segments through adhesive layers, where the porous honeycomb segments are provided with numerous circulation holes defined by partition walls and said circulation holes penetrated in an axial direction, wherein the respective pieces of the porous honeycomb segments are stacked while interposing the adhesive layers between respective adhered surfaces, the porous honeycomb segments are bonded together by performing main pressurization on the whole through the porous honeycomb segments located on an outermost layer after stacking a predetermined number of pieces, the main pressurization is performed by use of pressing jigs, wherein said jigs include pressing ribs in a number equivalent to the number of porous honeycomb segments located on the outermost layer of the honeycomb structure, and wherein the pressing ribs are provided on a pressing surface of the pressing jigs so as to abut on approximate centers of the surfaces of the porous honeycomb segments on the outermost layer of the honeycomb structure.

2. The bonding method of a ceramic honeycomb structure according to claim 1, wherein the respective porous honeycomb segments are subjected to preliminary pressurization at the time of stacking by weaker pressure than the main pressurization.

3. The bonding method of a ceramic honeycomb structure according to claim 2, wherein the preliminary pressurization is performed at pressure equal to or below 0.5 kgf/cm2.

* * * * *